UNITED STATES PATENT OFFICE.

CHARLES VINCENT McCARTHY ATKINSON, OF MADRAS, INDIA.

METHOD OF PRESERVING THE NATURAL FLAVOR OF AN ARTICLE OF FOOD.

1,058,682. Specification of Letters Patent. Patented Apr. 8, 1913.

No Drawing. Application filed February 15, 1913. Serial No. 748,715.

*To all whom it may concern:*

Be it known that I, CHARLES VINCENT McCARTHY ATKINSON, a subject of the King of Great Britain and Ireland, residing at Madras, British India, have invented a new and useful Method of Preserving the Natural Flavor of an Article of Food, of which the following is a specification.

I have found that, in the cold storage of foods, (and especially of birds, for example,) whose flavor is liable to be injured by cold storage, if the food, (which I will presume for example to be birds), be inclosed in a bag which is made, as far as practicable, impervious to air, and then be immediately placed and kept in cold storage while in the said bag, the flavor of the birds is efficiently preserved, and the injurious effects of the cold storage upon such flavor are obviated.

The bags employed for the purposes of my invention may be of any suitable material which is sufficiently impervious to air and which can be securely closed by any suitable means which will exclude air. It may for example consist of a paper bag, which is covered, or saturated, with a substance, or preparation, such, for instance, as lard, butter, wax, or the like. Such substance, or preparation, should be of a nature which will not impart an unpleasant, or foreign, flavor to the inclosed bird, and which may be of such a character as will allow of the bag being used in cooking the bird.

The bag may be made in any convenient manner, and of any convenient shape and size, and it may be made so that, when closed, any joint in it may be covered with a sealing composition, or matter.

Although I have particularly mentioned birds, it is to be understood that my invention may be employed to preserve the flavor of any other articles of food whose flavor it is desired to preserve.

I am aware that it has been proposed to place articles of food in a bag, or cover, and to then embed them in a block of ice so as to exclude air and to place the block of ice in a refrigerator, and that it has also been proposed to use a waterproof and approximately air-tight inclosure for frozen, or fresh, produce for the purpose of transit, and I do not claim broadly placing articles of food in impervious receptacles, but only the inclosure of such articles in impervious bags in conjunction with the immediate placement in cold storage of the articles so inclosed.

Having now particularly described and ascertained the nature of my said invention, and in what manner the same is to be performed, I declare that what I claim is:—

The method herein described of preserving the natural flavor of an article of food, said method consisting in inclosing the article in a paper envelop which is substantially impervious to air and placing the article in cold storage while inclosed in said envelop, to preserve the flavor of the article from the injurious effects of cold storage, the said original substantially impervious envelop serving, also, as a cooking bag when the article is removed from cold storage.

In testimony whereof I have signed my name to this specification in the presence of two subscribing witnesses.

CHARLES VINCENT McCARTHY ATKINSON.

Witnesses:
EDWIN S. BARWELL,
V. R. JEVISHNASOURI PILLAY.